United States Patent
Ito et al.

(10) Patent No.: US 9,080,613 B2
(45) Date of Patent: Jul. 14, 2015

(54) STARTING DEVICE

(71) Applicants: AISIN AW CO., LTD., Anjo-shi, Aichi-ken (JP); AISIN AW INDUSTRIES CO., LTD, Echizen-shi, Fukui (JP); EXEDY Corporation, Neyagawa-shi, Osaka (JP)

(72) Inventors: Kazuyoshi Ito, Tsushima (JP); Masahiro Ishikawa, Anjo (JP); Junji Tanaka, Anjo (JP); Fumimasa Kasashima, Sabae (JP); Naohisa Yamashita, Sakai (JP); Takeshi Watanabe, Neyagawa (JP)

(73) Assignees: ASIN AW CO., LTD., Anjo (JP); AISIN AW INDUSTRIES CO., LTD., Echizen-shi (JP); EXEDY CORPORATION, Neyagawa-shi (JP)

( * ) Notice: Subject to any disclaimer, the term of this patent is extended or adjusted under 35 U.S.C. 154(b) by 0 days.

(21) Appl. No.: 14/350,216

(22) PCT Filed: Nov. 1, 2012

(86) PCT No.: PCT/JP2012/078294
§ 371 (c)(1),
(2) Date: Apr. 7, 2014

(87) PCT Pub. No.: WO2013/065775
PCT Pub. Date: May 10, 2013

(65) Prior Publication Data
US 2014/0251746 A1    Sep. 11, 2014

(30) Foreign Application Priority Data

Nov. 4, 2011    (JP) .................................. 2011-242897

(51) Int. Cl.
*F16H 45/02*    (2006.01)
(Continued)

(52) U.S. Cl.
CPC    *F16D 13/52* (2013.01); *F16D 3/12* (2013.01); *F16F 15/134* (2013.01); *F16H 45/02* (2013.01); *F16F 15/12366* (2013.01); *F16H 41/28* (2013.01); *F16H 2045/0231* (2013.01)

(58) Field of Classification Search
CPC .................. F16H 2045/0231; F16F 15/12366
See application file for complete search history.

(56) References Cited

U.S. PATENT DOCUMENTS

| | | | |
|---|---|---|---|
| 2007/0056820 A1* | 3/2007 | Degler | 192/3.29 |
| 2011/0226576 A1* | 9/2011 | Feldhaus et al. | 192/3.28 |
| 2011/0240432 A1* | 10/2011 | Takikawa et al. | 192/3.29 |

FOREIGN PATENT DOCUMENTS

| | | |
|---|---|---|
| DE | 10 2008 060 940 A1 | 6/2010 |
| JP | A-2006-183776 | 7/2006 |

(Continued)

OTHER PUBLICATIONS

International Search Report issued in International Application No. PCT/JP2012/078294 mailed Jan. 29, 2014.

*Primary Examiner* — Richard Lorence
(74) *Attorney, Agent, or Firm* — Oliff PLC

(57) ABSTRACT

A starting device configured with a multi-plate clutch and a damper device. The damper device may include an input element to which power from a motor is transmitted via the multi-plate clutch, an outer peripheral-side elastic body to which the power is transmitted from the input element, an inner peripheral-side elastic body that is placed on an inner peripheral side of the outer peripheral-side elastic body, an intermediate element that transmits the power from the outer peripheral-side elastic body to the inner peripheral-side elastic body, and an output element to which the power is transmitted from the inner peripheral-side elastic body. The input element may be coupled to a clutch drum of the multi-plate clutch so that the input element and the clutch drum interpose the intermediate element therebetween.

6 Claims, 5 Drawing Sheets

(51) Int. Cl.
*F16F 15/123* (2006.01)
*F16D 13/52* (2006.01)
*F16F 15/134* (2006.01)
*F16D 3/12* (2006.01)
*F16H 41/28* (2006.01)

(56) References Cited

FOREIGN PATENT DOCUMENTS

| | | |
|---|---|---|
| JP | 2011-18538 A * | 9/2011 |
| JP | A-2011-190845 | 9/2011 |
| JP | A-2011-208791 | 10/2011 |

* cited by examiner

STARTING DEVICE

TECHNICAL FIELD

The present invention relates to starting devices that include a multi-plate clutch and a damper device.

BACKGROUND ART

Conventionally, devices including a multi-plate clutch that moves toward a front cover connected to a motor and presses a friction plate against the front cover and a damper device that is coupled to a clutch drum of the multi-plate clutch are known as this type of starting devices (see, e.g., Patent Document 1).

RELATED ART DOCUMENTS

Patent Documents

[Patent Document 1] German Patent Application Publication No. 102008060940

SUMMARY OF THE INVENTION

Although Patent Document 1 does not describe a specific configuration of the damper device, one way to transmit power from the multi-plate clutch to the damper device is to make the clutch drum directly contact an elastic body of the damper device. However, the use of such a structure may complicate the shape of the clutch drum and may degrade workability and assembling properties of parts. Either a multi-plate clutch or a single-plate clutch is typically selected as a clutch to be combined with the damper device, depending on required torque capacity. However, it is advantageous in various aspects such as cost and parts management if main components of a device that is combined with the multi-plate clutch can be used also in a damper device that is combined with the single-plate clutch.

It is a primary object of the present invention to simplify the structure of a clutch drum of a multi-plate clutch and to allow main components of a damper device to which power from a motor is transmitted via the multi-plate clutch to be used also in a damper device to which the power from the motor is transmitted via a single-plate clutch.

A starting device of the present invention uses the following means in order to achieve the above primary object.

A starting device according to the present invention is a starting device including: a multi-plate clutch; and a damper device including an input element to which power from a motor is transmitted via the multi-plate clutch, an outer peripheral-side elastic body to which the power is transmitted from the input element, an inner peripheral-side elastic body that is placed on an inner peripheral side of the outer peripheral-side elastic body, an intermediate element that transmits the power from the outer peripheral-side elastic body to the inner peripheral-side elastic body, and an output element to which the power is transmitted from the inner peripheral-side elastic body, characterized in that the input element is coupled to a clutch drum of the multi-plate clutch so that the input element and the clutch drum interpose the intermediate element therebetween.

The input element of the damper device forming this starting device is coupled to the clutch drum of the multi-plate clutch so that the input element and the cutch drum interpose the intermediate element therebetween. The input element is thus placed on the opposite side from the cluth drum of the multi-plate clutch with the intermediate element interposed therebetween, is coupled to the clutch drum, and is made to contact one end of the outer peripheral-side elastic body from the opposite side from the clutch drum. The function of the clutch drum of the multi-plate clutch to contact the outer peripheral-side elastic body can thus be omitted, and the structure of the clutch drum can be simplified. Moreover, placing the input element on the opposite side from the clutch drum of the multi-plate clutch can suppress interference of the input element with the intermediate element, the output element, etc., and can eliminate the need to design the intermediate element, the output element, etc. specially for the damper device to which the power is transmitted from the multi-plate clutch. Thus, omitting the input element and using another input element that is not attached to the clutch drum but instead is attached to a piston forming a single-plate clutch and that contacts one end of the outer peripheral-side elastic body from the piston side allows the primary components such as the intermediate element, the output element, the outer peripheral-side elastic body, and the inner peripheral-side elastic body to be also used in a damper device to which the power from the motor is transmitted via the single-plate clutch.

The input element may have a contact portion extending toward the multi-plate clutch and contacting one end of the outer peripheral-side elastic body. This allows the input element to be placed without interfering with other members.

The intermediate element may be supported in axial and radial directions by the output element, and the clutch drum may be supported in the radial direction by the output element. Accordingly, since the intermediate member that is supported in the axial and radial directions by the output element is interposed between the clutch drum and the input element, the clutch drum and the input element can be supported in the axial direction by the intermediate member without performing special processing on the intermediate member. Moreover, since the clutch drum is supported in the radial direction by the output element, the input element that is coupled to the clutch drum can also be supported in the radial direction by the output element. This eliminates the need to perform special processing on the intermediate element and the output element in order to support the input element in the axial and radial directions, and the primary components such as the intermediate element, the output element, the outer peripheral-side elastic body, and the inner peripheral-side elastic body can be more easily used also in the damper device to which the power from the motor is transmitted via the single-plate clutch.

A plurality of the outer peripheral-side elastic bodies may be arranged in a circumferential direction, the input element may have a plurality of elastic body support portions each supporting an outer periphery of the outer peripheral-side elastic body, and may contact one of the outer peripheral-side elastic bodies adjoining each other, and the intermediate element may include a first intermediate member that surrounds the plurality of outer peripheral-side elastic bodies, that is supported in the radial direction by the clutch drum, and that has a first contact portion located between the outer peripheral-side elastic bodies adjoining each other so as to contact both of the outer peripheral-side elastic bodies, and a second intermediate member that has a second contact portion contacting the other of the outer peripheral-side elastic bodies adjoining each other. In this case, omitting the input element and using another input element that is not attached to the clutch drum but instead is attached to a piston forming a single-plate clutch, that has contact portions each contacting one end of the outer peripheral-side elastic body from the piston side and elastic body support portions each supporting the outer periphery of the outer peripheral-side elastic body, and that supports the first intermediate member in the radial direction allows the primary components such as the intermediate element, the output element, the outer peripheral-side elastic bodies, and the inner peripheral-side elastic body to be also used in the damper device to which the power from the motor is transmitted via the single-plate clutch.

The first intermediate member may be supported in the radial direction by an axially extending portion formed in the clutch drum. This allows the first intermediate member to be easily supported in the radial direction by the clutch drum.

The second intermediate member may include a first plate that has the second contact portion and that is interposed between the clutch drum and the input element, and a second plate that is coupled to the first plate so that the second plate and the first plate interpose the inner peripheral-side elastic body and the output element therebetween and that is supported in the radial direction by the output element.

The multi-plate clutch may have a piston that moves toward a power input member connected to the motor and that presses a friction plate against the power input member. That is, such a multi-plate clutch is engaged by moving the piston toward the power input member. This can easily suppress interference between the multi-plate clutch and the damper device. Accordingly, combining the multi-plate clutch having such a configuration with the damper device according to the present invention eliminates the need to perform special processing on the intermediate element and the output element in order to suppress interference with the multi-plate clutch, and allows the primary components such as the intermediate element, the output element, the outer peripheral-side elastic body, and the inner peripheral-side elastic body to be easily used also in the damper device to which the power from the motor is transmitted via the single-plate clutch.

MODES FOR CARRYING OUT THE INVENTION

A mode for carrying out the present invention will be described below by using an embodiment.

Figure 1:
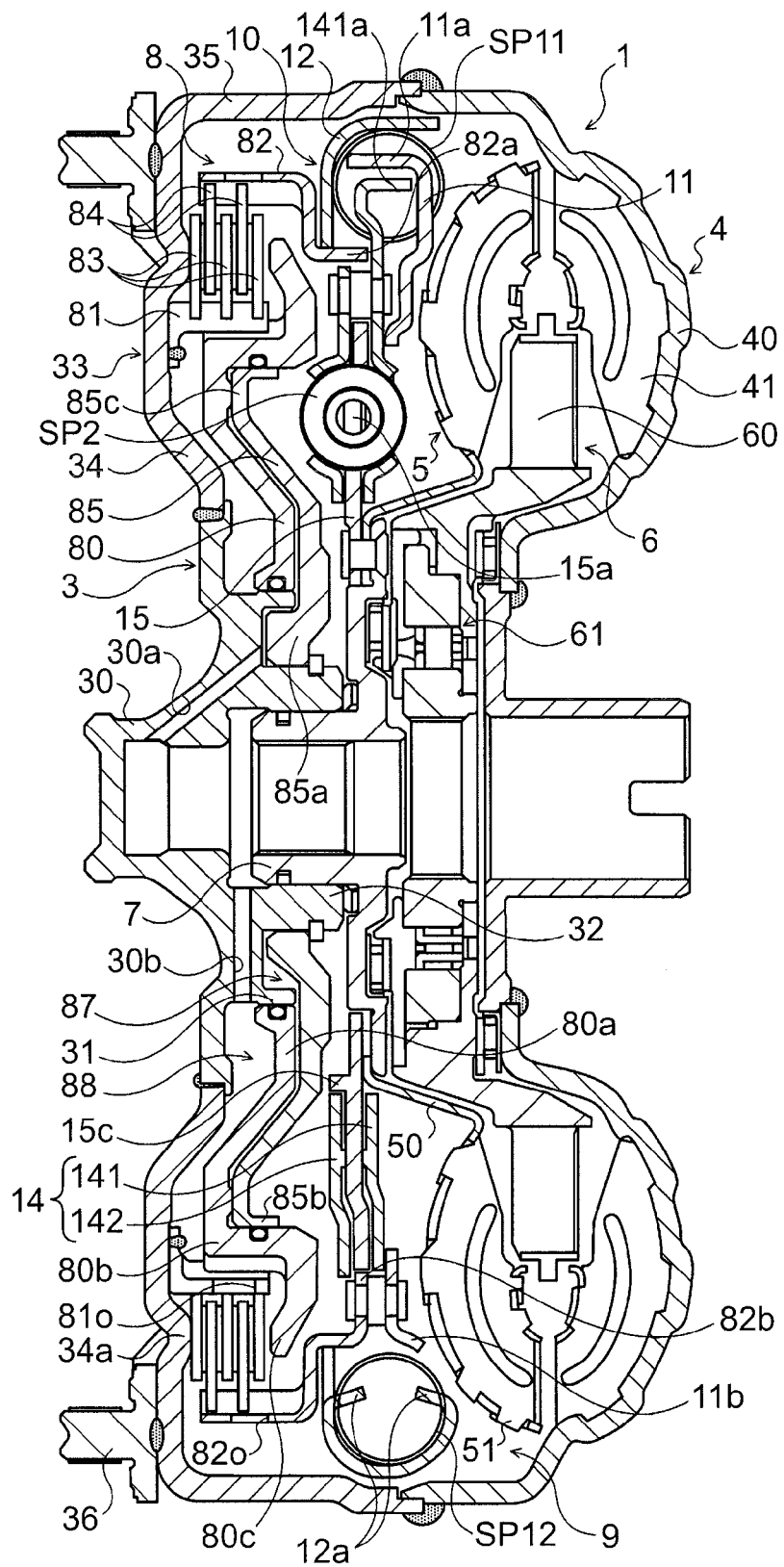
FIG. 1 is a partial sectional view showing a hydraulic transmission device 1 as a starting device according to an embodiment of the present invention.

FIG. 1 is a configuration diagram showing a hydraulic transmission device 1 as a starting device according to an embodiment of the present invention. The hydraulic transmission device 1 shown in the figure is a torque converter that is mounted as a starting device on a vehicle including an engine (internal combustion engine) as a motor, and includes: a front cover (power input member) 3 that is connected to a crankshaft of the engine, not shown; a pump impeller (input-side hydraulic transmission element) 4 fixed to the front cover 3; a turbine runner (output-side hydraulic transmission element) 5 capable of rotating coaxially with the pump impeller 4; a stator 6 that regulates the flow of hydraulic oil (working fluid) from the turbine runner 5 to the pump impeller 4; a turbine hub (power output member) 7 that is fixed to an input shaft of a shift device as an automatic transmission (AT) or a continuously variable transmission (CVT), not shown; a multi-plate friction lockup clutch mechanism 8; and a damper device 10 connected to the turbine hub 7 and connected to the lockup clutch mechanism 8.

The front cover 3 includes a centerpiece 30 and a cover body 33 that has a sidewall portion 34 fixed to the centerpiece 30 by welding and extending in the radial direction and an outer cylindrical portion 35 extended from the outer periphery of the sidewall portion 34 in the axial direction of the hydraulic transmission device 1. A set block 36, which is coupled to a drive plate (not shown) attached to the crankshaft of the engine, not shown, is fixed to an outer peripheral portion of the sidewall portion 34 of the cover body 33 by welding etc. The pump impeller 4 has a pump shell 40 firmly fixed to the outer cylindrical portion 35 of the front cover 3, and a plurality of pump blades 41 arranged on the inner surface of the pump shell 40. The turbine runner 5 has a turbine shell 50 and a plurality of turbine blades 51 arranged on the inner surface of the turbine shell 50. The turbine shell 50 is fitted in the turbine hub 7, and is fixed to the turbine hub 7 via a rivet. The stator 6 has a plurality of stator blades 60, and the rotation direction of the stator 6 is set to only one direction by a one-way clutch 61. The pump impeller 4 and the turbine runner 5 face each other, and the pump impeller 4, the turbine runner 5, and the stator 6 form a torus (annular flow path) in which hydraulic oil is circulated.

The lockup clutch mechanism 8 is capable of performing a lockup operation of coupling the front cover 3 as the power input member to the turbine hub 7, namely the input shaft of the shift device, via the damper device 10, and is capable of cancelling the lockup. As shown in FIG. 1, the lockup clutch mechanism 8 is placed between the damper device 10 and the sidewall portion 34 of the front cover 3. The lockup clutch mechanism 8 includes: a lockup piston 80 that is supported by the front cover 3 so as to be movable in the axial direction; an annular clutch hub 81 that is fixed to the sidewall portion 34 of the front cover 3 (cover body 33) so as to face the lockup piston 80; a clutch drum 82 that is coupled to the input shaft of the shift device via the damper device 10; a plurality of first friction plates 83 (separator plates) that are fitted in splines formed in the outer periphery of the clutch hub 81; a plurality of second friction plates (plate bodies having a friction material) 84 that are fitted in splines formed in the inner periphery of the clutch drum 82; and an annular flange member (oil-chamber defining member) 85 that is fixed to the centerpiece 30 of the front cover 3 so as to be located closer to the damper device 10 than the lockup piston 80 is.

The lockup piston 80 has: an inner peripheral portion 80a that is fitted on a first cylindrical portion (first support portion) 31 formed in the centerpiece 30 and faces the inner surface of the front cover 3 (the sidewall portion 34 of the cover body 33 etc.); a cylindrical portion 80b extended from an outer peripheral portion of the inner peripheral portion 80a toward the damper device 10 and in the axial direction; and a pressing portion 80c extended outward from the cylindrical portion 80b and toward the front cover 3. As shown in FIG. 1, the inner peripheral portion 80a of the lockup piston 80 is in sliding contact with the outer peripheral surface of the first cylindrical portion 31 of the centerpiece 30 via a seal member such as an O-ring. As shown in the figure, the cylindrical portion 80b of the lockup piston 80 is spline-fitted in an inner peripheral portion of the clutch hub 81 fixed to the front cover 3 (cover body 33), whereby a part of the lockup piston 80 is placed on the inner peripheral side of the clutch hub 81, and the lockup piston 80 is supported by the front cover 3 so as to be movable in the axial direction of the hydraulic transmission device 1. Moreover, the pressing portion 80c of the lockup piston 80 faces an approximately middle portion (middle portion between the outer and inner peripheries) of one of the plurality of first friction plates 83 fitted on the clutch hub 81, which is located closest to the damper device 10.

Figure 3:
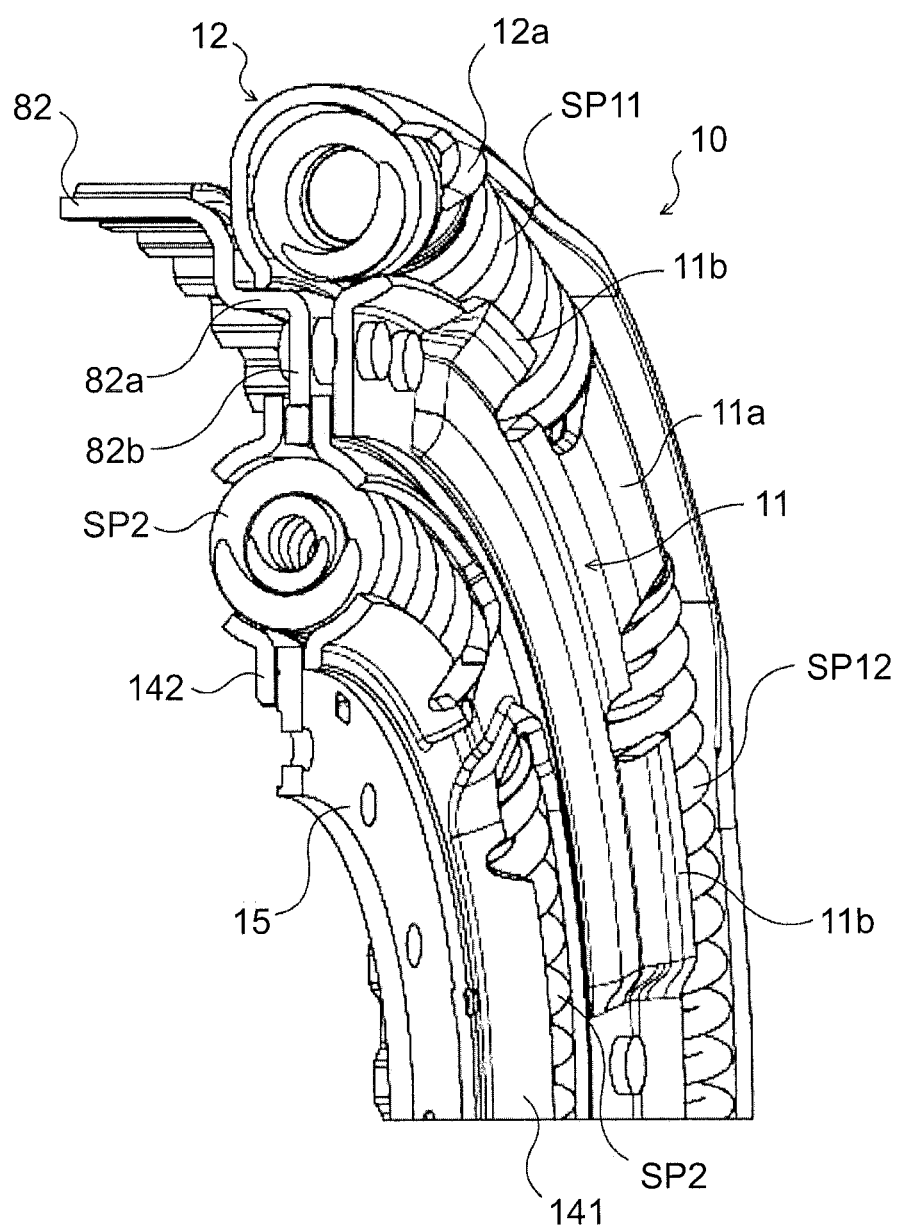
FIG. 3 is an enlarged perspective view showing a main part of the damper device 10.

The clutch hub 81 is fixed to the inner surface of the sidewall portion 34 of the cover body 33 by welding, and as shown in the figure, the clutch hub 81 and the clutch drum 82 are placed in a region located on the outer peripheral side in the front cover 3. As shown in FIGS. 1 and 3, the clutch drum 82 has an annular portion (axially extending portion) 82a extending in the axial direction to the opposite side from the front cover 3, and fastening portions 82b each extended radially inward from the end of the annular portion 82a. Moreover, the sidewall portion 34 of the cover body 33 has an annular protruding portion 34a that is formed by press molding so as to protrude in the axial direction toward the lockup piston 80, and that contacts an approximately middle portion (middle portion between the outer and inner peripheries) of one of the plurality of first friction plates 83 supported by the clutch hub 81, which is located closest to the front cover 3. Since the protruding portion contacting one of the first and second friction plates 83, 84 is thus formed in the front cover 3 (sidewall portion 34), a so-called backing plate (end plate) can be omitted, whereby the number of parts can be reduced. Moreover, since the bend portion is thus formed in the front cover 3 (sidewall portion 34), rigidity of the sidewall portion 34 (front cover 3) can further be improved.

Figure 2:
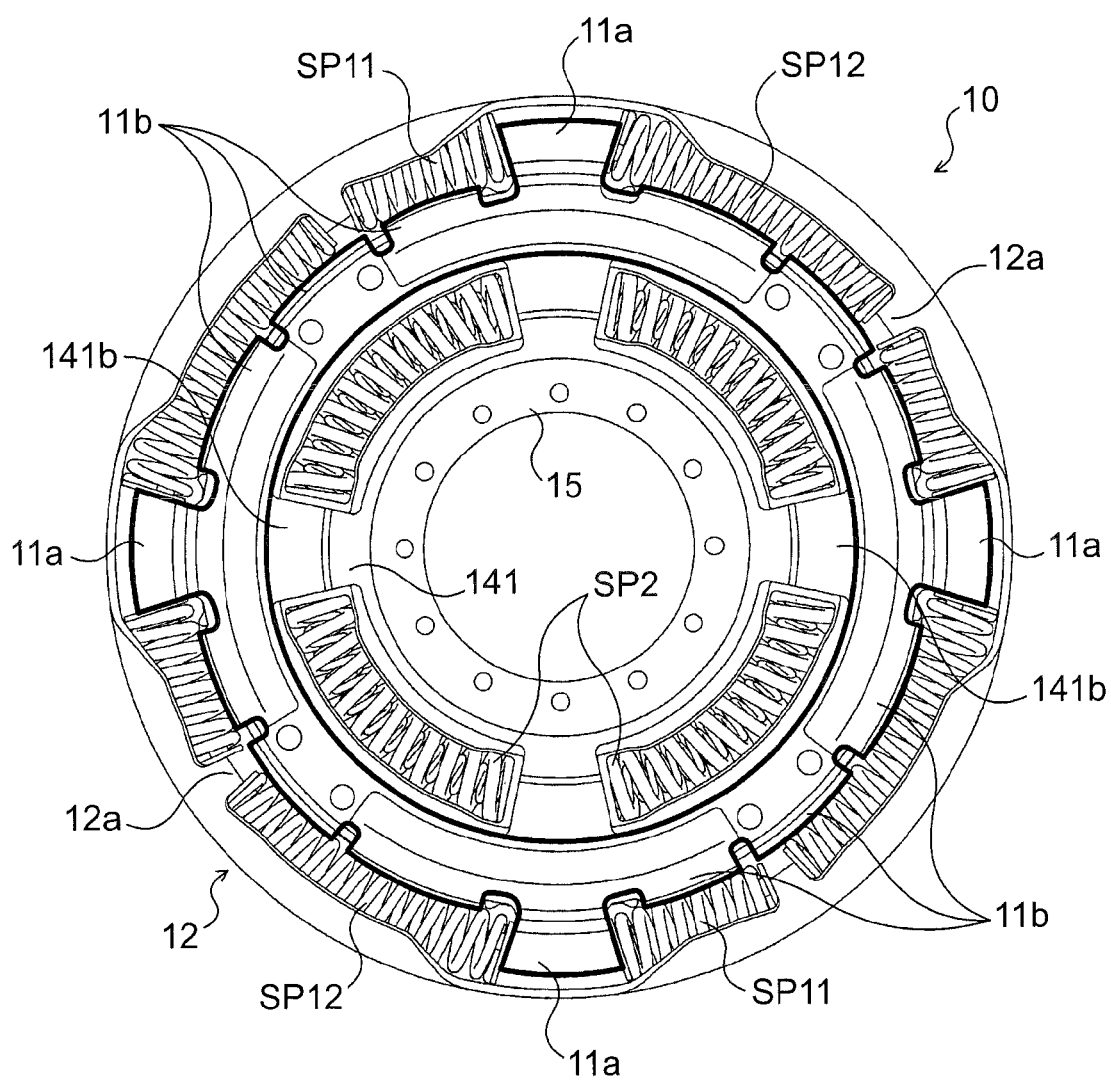
FIG. 2 is a rear view showing a damper device 10 of the hydraulic transmission device 1.

The flange member 85 has: a base portion 85a that is fitted on a second cylindrical portion (second support portion) 32 formed in the centerpiece 30 so as to be located on the inner peripheral side of the first cylindrical portion 31 and to protrude more toward the damper device 10 than the first cylindrical portion 31 does; a cylindrical outer peripheral portion 85b that is in sliding contact with the inner peripheral surface of the cylindrical portion 80b of the lockup piston 80 via a seal member such as an O-ring to guide axial movement of the lockup piston 80; and a piston movement restricting portion 85c having an annular surface extending inward and in the radial direction (direction perpendicular to the axial direction) from the outer edge on the lockup piston 80 side of the outer peripheral portion 85b. As shown in FIG. 2, the second cylindrical portion 32 of the centerpiece 30 is formed so as to overlap the end on the damper device 10 side of the first cylindrical portion 31 as viewed in the radial direction, and the base portion 85a of the flange member 85 is inserted in the overlapping portion (recessed portion) between the first cylindrical portion 31 and the second cylindrical portion 32. The first cylindrical portion 31 and the flange member 85 fitted on the second cylindrical portion 32 thus overlap each other as viewed in the radial direction. The flange member 85 (base portion 85a) is fixed to the centerpiece 30 (front cover 3) in the axial direction by using a snap ring. The second cylindrical portion 32 of the centerpiece 30 is rotatably fitted on the turbine hub 7, and a seal member such as an O-ring is placed therebetween.

The flange member 85 guides axial movement of the lockup piston 80, and together with the lockup piston 80 defines an engagement-side oil chamber 87 on the opposite side of the lockup piston 80 from the front cover 3 (sidewall portion 34). Hydraulic oil (lockup pressure) that engages the lockup clutch mechanism 8 (that brings the lockup clutch mechanism 8 into a fully engaged state or a slipping state) is supplied from a hydraulic control device (not shown) connected to an oil pump, not shown, that is driven by the engine to the engagement-side oil chamber 87 through an oil passage formed in the input shaft of the shift device and an oil passage 30a formed in the centerpiece 30. In the embodiment, the oil passage 30a formed in the centerpiece 30 opens to the engagement-side oil chamber 87 in the axial direction, as shown in FIG. 1.

Moreover, the front cover 3 and the lockup piston 80 define, on the inner peripheral side of the clutch hub 81, i.e., on the inner peripheral side of the first and second friction plates 83, 84, an oil passage (oil chamber) 88 that supplies hydraulic oil into a hydraulic transmission chamber 9 defined by the front cover 3 and the pump shell 40 of the pump impeller 4, namely that supplies hydraulic oil to the first and second friction plates 83, 84, the pump impeller 4, the turbine hub 7, the damper device 10, etc. Hydraulic oil (e.g., a circulation pressure obtained by reducing a line pressure etc.) to be supplied into the hydraulic transmission chamber 9 is supplied from the hydraulic control device, not shown, to the oil passage 88 via the oil passage formed in the input shaft of the shift device and an oil passage 30b formed in the centerpiece 30. As shown in FIG. 1, an opening 81o that allows the oil passage 88 to communicate with the first and second friction plate 83, 84 side, namely the hydraulic transmission chamber 9, is formed in the clutch hub 81, and an opening 82o that allows the oil passage 88 side to communicate with the hydraulic transmission chamber 9 is formed in the clutch drum 82.

As shown in FIGS. 1 and 2, the damper device 10 includes: a drive member 11 as an input element; a first intermediate member (intermediate element) 12 that engages with the drive member 11 via a plurality of first outer peripheral springs (outer peripheral-side elastic body) SP11; a second intermediate member (intermediate element) 14 that engages with the first intermediate member 12 via a plurality of second outer peripheral springs (outer peripheral-side elastic body) SP12; and a driven member (output element) 15 that engages with the second intermediate member 14 via a plurality of inner peripheral springs (inner peripheral-side elastic body) SP2. In the embodiment, the first outer peripheral springs SP11 and the second outer peripheral springs SP12 are coil springs each made of a metal material wound in a helical shape so as to have a central axis extending straight when not subjected to a load. The first outer peripheral springs SP11 have higher rigidity than the second outer peripheral springs SP12. The inner peripheral springs SP2 are arc springs each made of a metal material wound so as to have a central axis extending in an arc shape when not subjected to a load.

The drive member 11 is placed in a region on the outer peripheral side in the hydraulic transmission chamber 9 defined by the front cover 3 and the pump shell 40 of the pump impeller 4, so as to be located on the opposite side of the second intermediate member 14 as the intermediate element from the clutch drum 82 of the lockup clutch mechanism 8, and is fixed to the plurality of fastening portions 82b of the clutch drum 82 via rivets. As shown in FIGS. 1 and 2, the drive member 11 has a plurality of spring contact portions 11a each extending toward the lockup clutch mechanism 8 and contacting one end of a corresponding one of the first outer peripheral springs SP11, and a plurality of spring support portions (elastic body support portions) 11b each supporting the outer periphery of a corresponding one of the first or second outer peripheral springs SP11, SP12.

The first intermediate member 12 is configured as an annular member that surround the first and second outer peripheral springs SP11, SP12 from the outside, and that together with the plurality of spring support portions 11b of the drive member 11 is capable of supporting the first and second outer peripheral springs SP11, SP12 such that the first and second outer peripheral springs SP11, SP12 are (alternately) arranged on the same circumference so as to adjoin each other. The first intermediate member 12 is rotatably fitted about the axis of the hydraulic transmission device 1 by the clutch drum 82 of the lockup clutch mechanism 8, is supported in the radial direction by the annular portion 82*a* of the clutch drum 82, and is placed in the region located on the outer peripheral side in the hydraulic transmission chamber 9. As shown in FIGS. 1 and 2, the first intermediate member 12 has a plurality of pairs of spring contact portions 12*a* (first contact portion), and each pair of spring contact portions 12*a* is placed between the other end of a corresponding one of the first outer peripheral springs SP11 and one end of the second outer peripheral spring SP12 adjoining this first outer peripheral spring SP11, and contacts both of this first outer peripheral spring SP11 and this second outer peripheral spring SP12.

The second intermediate member 14 is formed by an annular first plate 141 that is interposed between the clutch drum 82 of the lockup clutch mechanism 8 and the drive member 11, and an annular second plate 142 that is coupled (fixed) to the first plate 141 via a rivet so that the second plate 142 and the first plate 141 interpose the inner peripheral springs SP2 and the driven member 15 therebetween. The first plate 141 of the second intermediate member 14 has on its outer peripheral side a plurality of spring contact portions (second contact portion) 141*a* each contacting the other end of a corresponding one of the second outer peripheral springs SP12, and has on its inner peripheral side a plurality of spring support portions that support the inner peripheral springs SP2. The second plate 142 of the second intermediate member 14 has spring support portions each facing the spring support portion of the first plate 141 to support the inner peripheral spring SP2. A plurality of spring contact portions 141*b* (see FIG. 2) each contacting one end of a corresponding one of the inner peripheral springs SP2 are formed in the first plate 141. A plurality of spring contact portions (not shown) each contacting one end of a corresponding one of the inner peripheral springs SP2 are formed in the second plate 142.

Thus, the plurality of first outer peripheral springs SP11 are placed in an outer peripheral portion of the damper device 10 such that each of the first outer peripheral springs SP11 is located between the spring contact portion 11*a* of the drive member 11 and the spring contact portions 12*a* of the first intermediate member 12, and the plurality of second outer peripheral springs SP12 are arranged in the outer peripheral portion of the damper device 10 such that each of the second outer peripheral springs SP12 is located between the spring contact portions 12*a* of the first intermediate member 12 and the second intermediate member 14, namely the spring contact portion 141*a* of the first plate 141. Each of the plurality of inner peripheral springs SP2 is placed so as to be separated from the first and second outer peripheral springs SP11, SP12 in the radial direction of the hydraulic transmission device 1, and is located on the inner peripheral side with respect to the first and second outer peripheral springs SP11, SP12.

The driven member 15 has a plurality of spring contact portions 15*a* each contacting the other end of a corresponding one of the inner peripheral springs SP2, and is fixed to the turbine hub 7 via a rivet. The driven member 15 is placed between the first plate 141 and the second plate 142 of the second intermediate member 14 so as to be interposed therebetween. The driven member 15 further has a plurality of plate support portions 15*c* protruding in the axial direction and rotatably supporting the inner periphery of the second plate 142 of the second intermediate member 14. In the embodiment, the second intermediate member 14 is thus supported in the axial and radial directions by the driven member 15 so as to be rotatable about the axis of the hydraulic transmission device 1.

As described above, the drive member 11 of the damper device 10 included in the hydraulic transmission device 1 is coupled to the clutch drum 82 of the lockup clutch mechanism 8 so that the drive member 11 and the clutch drum 82 interpose the first and second intermediate members 12, 14 as the intermediate element therebetween, and has the plurality of spring contact portions 11*a* each extending toward the lockup clutch mechanism 8 and each contacting one end of a corresponding one of the first outer peripheral springs SP11. The drive member 11 as the input element is thus placed on the opposite side of the first and second intermediate members 12, 14 from the clutch drum 82 of the lockup clutch mechanism 8, is coupled to the clutch drum 82, and is made to contact one ends of the first outer peripheral springs SP11 from the opposite side from the clutch drum 82. The function of the clutch drum 82 of the lockup clutch mechanism 8 to contact the first outer peripheral springs SP11 can thus be omitted, and the structure of the clutch drum 82 can be simplified.

Figure 4:
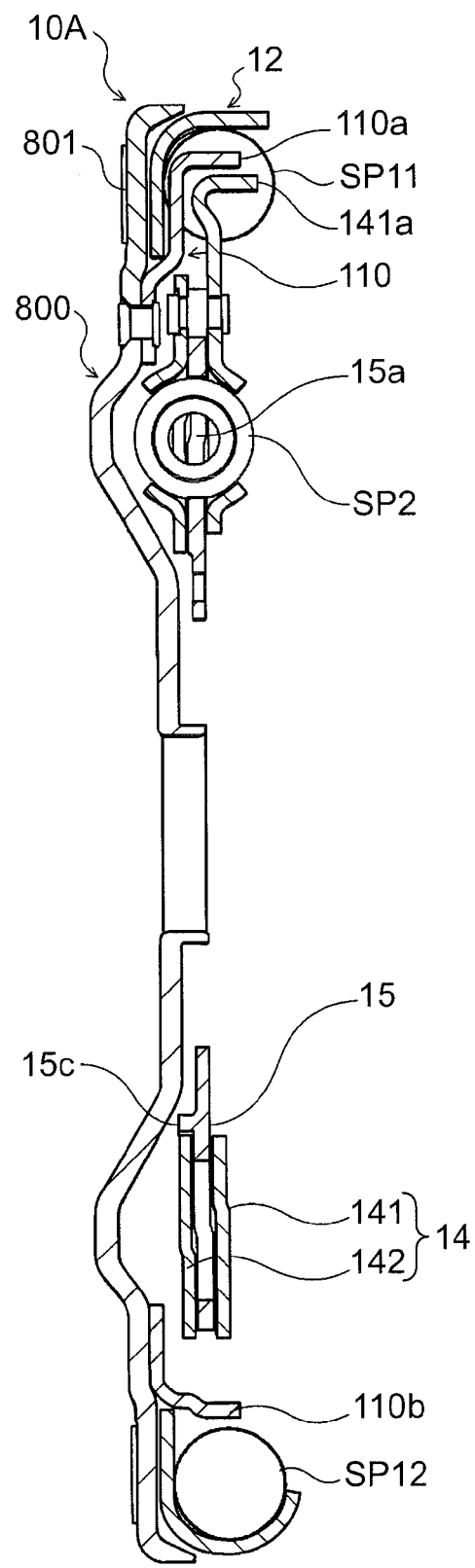
FIG. 4 is a schematic configuration diagram showing a damper device 10A using main components of the damper device 10.
Figure 5:
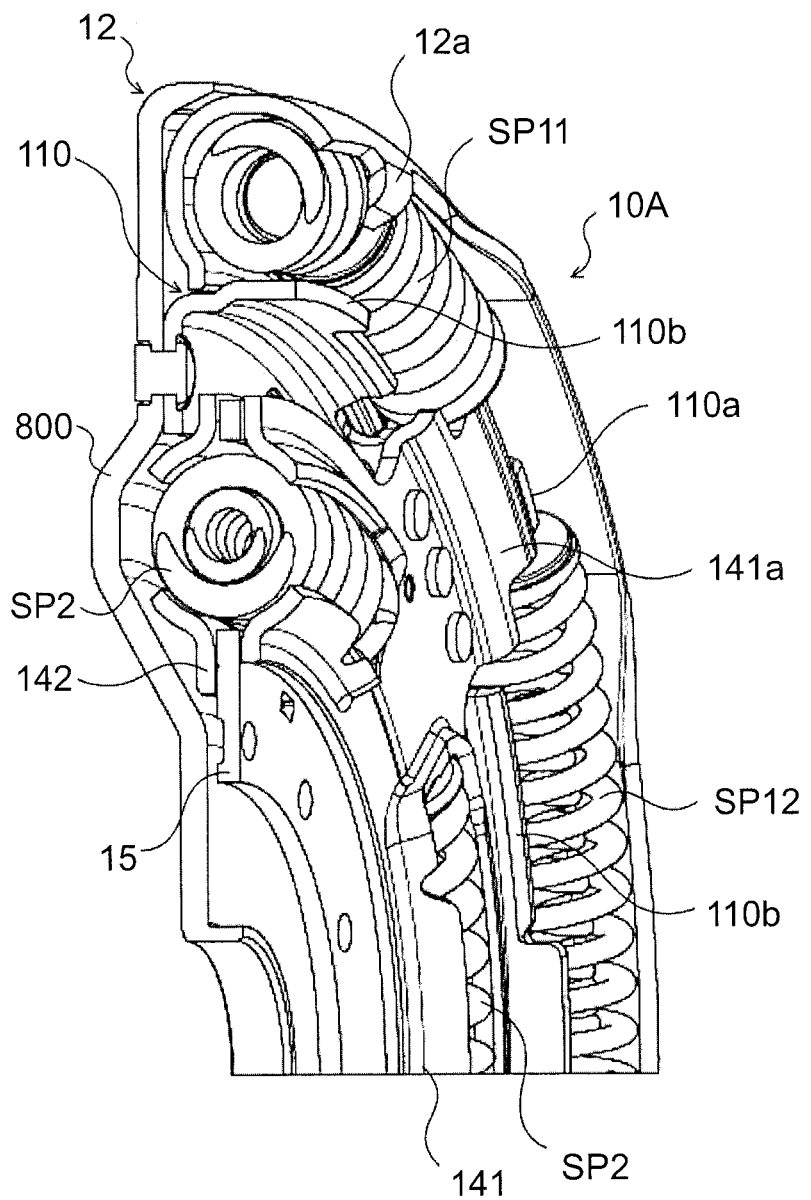
FIG. 5 is an enlarged perspective view showing a main part of the damper device 10A.

The drive member 11 is placed on the opposite side from the clutch drum 82 of the lockup clutch mechanism 8, and each of the spring contact portions 11*a* extending toward the lockup clutch mechanism 8 is made to contact one end of the first outer peripheral spring SP11. This can suppress interference of the drive member 11 with the first and second intermediate members 12, 14, the driven member 15, etc., and eliminates the need to design the first and second intermediate members 12, 14, the driven member 15, etc. specially for the damper device 10 to which power (torque) is transmitted from the multi-plate friction lockup clutch mechanism 8. Thus, as shown in FIGS. 4 and 5, omitting the drive member 11 and using a drive member 110 that is not attached to the clutch drum 82 but instead is attached via a rivet to a lockup piston 800 having a friction material 801 and forming a single-plate friction lockup clutch mechanism and that has spring contact portions 110*a* each contacting one end of the first outer peripheral spring SP11 from the lockup piston 800 side allows the primary components such as the first and second intermediate members 12, 14, the driven member 15, the first and second outer peripheral springs SP11, SP12, and the inner peripheral springs SP2 to be also used in a damper device 10A to which power from the engine is transmitted via the single-plate friction lockup clutch mechanism.

In the embodiment, the plurality of first outer peripheral springs SP11 and the plurality of second outer peripheral springs SP12 as the outer peripheral-side elastic body are arranged in the circumferential direction, and the drive member 11 has the plurality of spring support portions 11*b* each supporting the outer periphery of the first or second outer peripheral spring SP11, SP12, and contacts the first outer peripheral spring SP11 as one of the first and second outer peripheral springs SP11, SP12 adjoining each other. The damper device 10 includes: the first intermediate member 12 surrounding the plurality of first and second outer peripheral springs SP11, SP12, supported in the radial direction by the annular portion 82*a* of the clutch drum 82, and having the spring contact portions 12*a* each located between the first and second outer peripheral springs SP11, SP12 adjoining each other so as to contact both of these first and second outer peripheral springs SP11, SP12; and the second intermediate member 14 having the spring contact portions 141*a* each contacting the other end of the second outer peripheral spring SP12 as the other of the first and second outer peripheral springs SP11, SP12 adjoining each other. Accordingly, as shown in FIGS. 4 and 5, the drive member 110 of the damper device 10A is configured to have, in addition to the spring contact portions 110a, a plurality of spring support portions 110b each supporting the outer periphery of the first or second outer peripheral spring SP11, SP12 and to support the first intermediate member 12 in the radial direction.

In the embodiment, the second intermediate member 14 forming the intermediate element is supported in the axial and radial directions by the driven member 15. The clutch drum 82 of the lockup clutch mechanism 8 is supported in the radial direction by the driven member 15. Thus, since the second intermediate member 14 that is supported in the axial and radial directions by the driven member 15 is interposed between the clutch drum 82 and the drive member 11, the clutch drum 82 and the drive member 11 can be supported in the axial direction by the second intermediate member 14 without performing special processing on the second intermediate member 14 as the intermediate element. Moreover, since the clutch drum 82 is supported in the radial direction by the driven member 15, the drive member 11 that is coupled to the clutch drum 82 can also be supported in the radial direction by the driven member 15. This eliminates the need to perform special processing on the second intermediate member 14 and the driven member 15 in order to support the drive member 11 in the axial and radial directions, and the primary components such as the first and second intermediate members 12, 14, the driven member 15, the first and second outer peripheral springs SP11, SP12, and the inner peripheral spring SP2 can be more easily used also in the damper device 10A to which power from the engine is transmitted via the single-plate friction lockup clutch mechanism.

The lockup clutch mechanism 8 has the lockup piston 80 that moves toward the front cover 3 as the power input member connected to the engine and presses the first and second friction plates 83, 84 against the front cover 3. Since such a lockup clutch mechanism 8 is engaged by moving the lockup piston 80 toward the front cover 3, interference between the damper device 10 and the components of the lockup clutch mechanism 8 such as the lockup piston 80 and the flange member 85 can be easily suppressed. Accordingly, combining the lockup clutch mechanism 8 having such a configuration with the damper device 10 eliminates the need to perform special processing on the second intermediate member 14 and the driven member 15 in order to suppress interference with the lockup clutch mechanism 8, and allows the primary components such as the first and second intermediate members 12, 14, the driven member 15, the first and second outer peripheral springs SP11, SP12, and the inner peripheral springs SP2 to be easily used also in the damper device 10A to which power from the engine is transmitted via the single-plate friction lockup clutch mechanism.

As described above, the damper device 10 that together with the multi-plate friction lockup clutch mechanism 8 forms the hydraulic transmission device 1 includes: the drive member 11 to which power from the engine is transmitted via the lockup clutch mechanism 8; the first outer peripheral springs SP11 to which the power is transmitted from the drive member 11; the first intermediate member 12 to which the power is transmitted from the first outer peripheral springs SP11 and the second intermediate member 14 to which the power is transmitted from the first outer peripheral springs SP11 via the first intermediate member 12 and the second outer peripheral springs SP12; the inner peripheral springs SP2 to which the power is transmitted from the second intermediate member 14; and the driven member 15 to which the power is transmitted from the inner peripheral springs SP2. The drive member 11 is coupled to the clutch drum 82 so that the drive member 11 and the clutch drum 82 of the lockup clutch mechanism 8 interpose the second intermediate member 14, and has the spring contact portions 11a each contacting one end of the first outer peripheral spring SP11. This can simplify the structure of the clutch drum 82 of the multi-plate friction lockup clutch mechanism 8, and allows the first and second intermediate members 12, 14, the driven member 15, the first and second outer peripheral springs SP11, SP12, and the inner peripheral springs SP2, which are the primary components of the damper device 10 to which power from the engine is transmitted via the lockup clutch mechanism 8, to be used also in the damper device 10A to which power from the engine is transmitted via the single-plate friction lockup clutch mechanism.

The damper device 10, 10A may be configured so that the driven member 15 is placed on the outer peripheral side in the hydraulic transmission chamber 9 and the drive member 11, 110 is placed on the inner peripheral side in the hydraulic transmission chamber 9, and the damper device 10, 10A may be configured as a so-called parallel type damper device. The damper device 10, 10A described above may be applied to a fluid coupling that does not include the stator regulating the flow of working fluid from the turbine runner toward the pump impeller. Moreover, in the damper device 10, 10A, the first and second outer peripheral springs SP11, SP12 may have the same specifications.

Correspondence between the primary elements of the embodiment and the primary elements of the invention described in "SUMMARY OF THE INVENTION" is shown by way of example to specifically describe the mode in which the embodiment carries out the invention described in "SUMMARY OF THE INVENTION." Thus, this correspondence is not intended to limit the elements of the invention described in "SUMMARY OF THE INVENTION." That is, the embodiment is merely a specific example of the invention described in "SUMMARY OF THE INVENTION," and the invention described in "SUMMARY OF THE INVENTION" should be construed based on the description therein.

Although the mode for carrying out the present invention is described above by using the embodiment, it should be understood that the present invention is not limited in any way to the above embodiment, and various modifications can be made without departing from the spirit and scope of the present invention.

INDUSTRIAL APPLICABILITY

The present invention can be used in the field of manufacturing starting devices, etc.

The invention claimed is:

1. A starting device, comprising: a multi-plate clutch; and a damper device including an input element to which power from a motor is transmitted via the multi-plate clutch, an outer peripheral-side elastic body to which the power is transmitted from the input element, an inner peripheral-side elastic body that is placed on an inner peripheral side of the outer peripheral-side elastic body, an intermediate element that transmits the power from the outer peripheral-side elastic body to the inner peripheral-side elastic body, and an output element to which the power is transmitted from the inner peripheral-side elastic body, wherein
the input element is coupled to a clutch drum of the multi-plate clutch so that the input element and the clutch drum interpose the intermediate element therebetween, a plurality of the outer peripheral-side elastic bodies are arranged in a circumferential direction, the input element has a plurality of elastic body support portions each supporting an outer periphery of the outer peripheral-side elastic body, and contacts one of the outer peripheral-side elastic bodies adjoining each other, and the intermediate element includes a first intermediate member that surrounds the plurality of outer peripheral-side elastic bodies, that is supported in a radial direction by the clutch drum, and that has a first contact portion located between the outer peripheral-side elastic bodies adjoining each other so as to contact both of the outer peripheral-side elastic bodies, and a second intermediate member that includes a first plate and a second plate and that has a second contact portion contacting the other of the outer peripheral-side elastic bodies adjoining each other.

2. The starting device according to claim 1, wherein the input element has a contact portion extending toward the multi-plate clutch and contacting one end of each of the plurality of outer peripheral-side elastic bodies.

3. The starting device according to claim 1, wherein the first intermediate member is supported in the radial direction by an axially extending portion formed in the clutch drum.

4. The starting device according to claim 1, wherein the first plate has the second contact portion, and the second plate is supported in the radial direction by the output element.

5. The starting device according to claim 1, wherein the multi-plate clutch has a piston that moves toward a power input member connected to the motor and that presses a friction plate against the power input member.

6. The starting device according to claim 1, wherein the first plate is interposed between the clutch drum and the input element, and the second plate is coupled to the first plate so that the second plate and the first plate interpose the inner peripheral-side elastic body and the output element therebetween, and the clutch drum is supported in the radial direction by the output element.

* * * * *